(12) United States Patent
Zink et al.

(10) Patent No.: US 12,133,030 B2
(45) Date of Patent: Oct. 29, 2024

(54) PROFILE-BASED STANDARD DYNAMIC RANGE AND HIGH DYNAMIC RANGE CONTENT GENERATION

(71) Applicant: WARNER BROS. ENTERTAINMENT INC., Burbank, CA (US)

(72) Inventors: Michael Zink, Escondido, CA (US); Ha Nguyen, Fullerton, CA (US)

(73) Assignee: Warner Bros. Entertainment Inc., Burbank, CA (US)

( * ) Notice: Subject to any disclaimer, the term of this patent is extended or adjusted under 35 U.S.C. 154(b) by 618 days.

(21) Appl. No.: 17/417,110

(22) PCT Filed: Dec. 19, 2019

(86) PCT No.: PCT/US2019/067684
§ 371 (c)(1),
(2) Date: Jun. 21, 2021

(87) PCT Pub. No.: WO2020/132371
PCT Pub. Date: Jun. 25, 2020

(65) Prior Publication Data
US 2022/0078386 A1 Mar. 10, 2022

Related U.S. Application Data

(60) Provisional application No. 62/783,094, filed on Dec. 20, 2018.

(51) Int. Cl.
*G06N 3/08* (2023.01)
*G06T 5/92* (2024.01)
*H04N 7/01* (2006.01)
*H04N 9/67* (2023.01)

(52) U.S. Cl.
CPC ............... *H04N 9/67* (2013.01); *G06N 3/08* (2013.01); *G06T 5/92* (2024.01); *H04N 7/0125* (2013.01); *G06T 2207/10016* (2013.01); *G06T 2207/20081* (2013.01); *G06T 2207/20084* (2013.01); *G06T 2207/20208* (2013.01)

(58) Field of Classification Search
CPC .......... H04N 9/67; H04N 7/0125; G06N 3/08; G06T 5/009; G06T 2207/10016; G06T 2207/20081; G06T 2207/20084; G06T 2207/20208; G06T 2207/10024
USPC .......... 382/156, 100; 706/12, 15, 25; 700/48
See application file for complete search history.

(56) References Cited

U.S. PATENT DOCUMENTS

2016/0343348 A1* 11/2016 Oh ..................... H04N 19/46
2017/0185871 A1*  6/2017 Zhang ............. G06V 30/19173
(Continued)

FOREIGN PATENT DOCUMENTS

KR     10-0638739 B1    10/2006
KR     10-1750058 B1     7/2017

OTHER PUBLICATIONS

WO, PCT/US2019/067684 ISR and Written Opinion, Apr. 20, 2020.

*Primary Examiner* — Sheela C Chawan
(74) *Attorney, Agent, or Firm* — Bookoff McAndrews, PLLC (57) ABSTRACT

A method for converting a source video content constrained to a first color space to a video content constrained to a second color space using an artificial intelligence machine-learning algorithm based on a creative profile.

20 Claims, 8 Drawing Sheets

(56) References Cited

U.S. PATENT DOCUMENTS

2018/0197032 A1 7/2018 Lee et al.
2022/0084170 A1* 3/2022 Aydin ..................... G06N 3/08

* cited by examiner

PROFILE-BASED STANDARD DYNAMIC RANGE AND HIGH DYNAMIC RANGE CONTENT GENERATION

CROSS-REFERENCE TO RELATED APPLICATION

The present application is a U.S. National Stage under 35 USC 371 of International Application No. PCT/US19/67684, filed Dec. 19, 2019, which claims priority to U.S. Provisional Application Ser. No. 62/783,094 filed Dec. 20, 2018, the disclosures of both of which are incorporated herein in their entireties by reference.

FIELD

The present application relates to digital image processing, and more particularly to systems and methods for converting Standard Dynamic Range content to High Dynamic Range based on creative profile information.

BACKGROUND

With the introduction of new content formats, specifically HDR (High Dynamic Range), much content is not available in this new format. Even for many new productions, SDR (Standard Dynamic Range) color grading sessions are separate from HDR color grading sessions, because content has a much larger color and luminance palette available. Color grading sessions are often manual processes, where (1) Director/Director of Photography (DP) takes representative frames from each shot in the EDL (edit decision list) and adjusts the color, contrast, density of each frame to create a scene by scene guide to the intended look for the picture; (2) the detailed guide then is passed to Colorist to complete the final grading for the picture.

However, for lots of legacy content, this manual HDR grading process is not viable, and some solution providers are attempting to apply automatic SDR-HDR conversions to solve this issue, but with very bad results. One purported solution might be usage of "machine learning" (ML) algorithms to improve the conversion quality. Format conversions based on machine learning algorithms have generally been very superficial. To improve ML algorithms, conventional wisdom is to train a Deep Neural Network (an ML algorithm) with as much content as possible. This will create an algorithm that provides a conversion result based on an average of all content provided. However, from a creative perspective, this will eliminate any unique creative styles that may be important for a given title.

It would be desirable, therefore, to provide new methods and other new technologies able to convert Standard Dynamic Range content to High Dynamic Range using machine-learning algorithm based on creative profile information that overcomes these and other limitations of the prior art.

SUMMARY

This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect of the disclosure, a method automatically converts a source video content constrained to a first color space to a video content constrained to a second color space using artificial intelligence (AI) machine-learning (ML) algorithm based on a creative profile. The source video content may be SDR content or raw video content. However, as used in the disclosure herein, unless otherwise specified, the source video content refers to SDR, and the converted video content is HDR.

In an aspect, the ML algorithms may define the creative profiles and guide the conversion process to maintain creative intent of the source video content.

In an aspect, the creative profile may comprise machine-readable data associating (e.g., that associates) the SDR video content with at least one personal identity. In this aspect, the personal identity may associate with a video production role comprising any one or more of a director, a director of photography (DP), a cinematographer, and a colorist.

In another aspect, the creative profile may comprise machine-readable data associating (e.g., that associates) the SDR video content with a facility. The facility may be an entity that provides the data for the creative profile.

In an aspect, the creative profile may comprise machine-readable data associating (e.g., that associates) the SDR video content with a genre of video content.

In an aspect, the creative profile may comprise machine-readable data associating (e.g., that associates) the SDR video content with a scheme for at least one of, color tones, contrast ranges, or black level preferences. In an aspect, the creative profile may comprise machine-readable data associating (e.g., that associates) the SDR video content with at least one of a Color Decision List (CDL) or a color Look-Up Table (LUT).

In an aspect, more than one creative profile may be used in a conversion process.

In an aspect, machine-learning algorithm comprises a deep neural network algorithm.

The method further may include training the machine-learning algorithm over a training set consisting essentially of images from the source video content (or source images), converted images using a creative profile, or both the source video content and the corresponding converted images. In an aspect, prior to training the machine-learning algorithm over the training set, the method may include training the machine-learning algorithm over a generic training set including content that matches multiple creative profiles.

In an aspect of the method, after a processor converts source images from a source video content to corresponding converted images comprising an HDR video content, the processor may populate the training set with the source images and the new corresponding converted images. As a result, the training set may continue to expand, and/or include newer and/or more accurate data. In an aspect, the processor may populate the training set with the source images and the corresponding converted images that have been manually converted. The training set may include as many examples of a creative's treatment of specifiable stylistic elements as possible, so as to identify relevant elements of, and to create, the creative profile. In an aspect, when converted images are used in a training set, the creative person (e.g., a Director, Director of Photography, or Colorist) whose profile was used in the conversion process may need to approve the converted images. The creative person may manually approve the converted images or may set parameter thresholds that a processor performing the method may use to automatically approve, or disapprove, the converted images.

In an aspect, the source video content may be raw video and the converted video content is SDR video content. In another aspect, the source video content may be raw video and the converted video content is HDR video content. A raw image or video content may contain minimally processed data from a digital camera or a film scan.

In an aspect, the source video content may be HDR video content and the converted video content is SDR video content. This process may be used when the converted content will be played on client devices with limited resolution or color space screens.

The methods described herein provide an automated process for automatically converting a source video content constrained to a first color space to a video content constrained to a second color space using artificial intelligence machine-learning algorithm based on a creative profile. Applications for the methods may include, for example, automatically converting existing and potentially legacy SDR video content to HDR video content. But since each Director/Director of Photography/Colorist has his/her own visual style, the method of the disclosure can maintain the original creative intent throughout this conversion process. In an exemplary application, the method may convert cinematic and/or episodic content where any loss of original intent is unacceptable. As an example, the method may employ a creative profile in the conversion process to preserve original intent with still frames showing stark, illustrative differences due to contrasting settings. In another example, a creative's style, for example a colorist's preference for expanding the dynamic range of the dark areas in images ("lifting the black"), may be specified in her creative profile from which the method may use in the conversion process or in training ML algorithm for specific visual style. On the other hand, another creative's style may reduce the dynamic range of the dark areas ("crushing the black). By using the specific creative profile for specific conversions, the method can preserve the original intent, or transfer the style of the creative into the new, converted video content.

In another exemplary application, the methods may learn free-form art style(s) of a creative, or the creative may input her style(s) into a creative profile. A free-form art style may be an artistic work style, for example, a drawing or painting style. The methods may then apply, or transfer, the style(s) into a video content without loss of the original content, although some original details may be converted using the style.

The foregoing methods may be implemented in any suitable programmable computing apparatus, by provided program instructions in a non-transitory computer-readable medium that, when executed by a computer processor, cause the apparatus to perform the described operations. The computer processor (or "processor") may be local to the apparatus and user, located remotely, or may include a combination of local and remote processors. An apparatus may include a computer or set of connected computers that is used in audio-video or production or for output of audio-video or virtual or augmented reality content to one or more users. Other elements of the apparatus may include, for example, a user input device, which participate in the execution of the method.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the examples may be employed. Other advantages and novel features will become apparent from the following detailed description when considered in conjunction with the drawings and the disclosed examples, which encompass all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify like elements correspondingly throughout the specification and drawings.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form to facilitate describing these aspects and novel combinations of elements.

Figure 1:
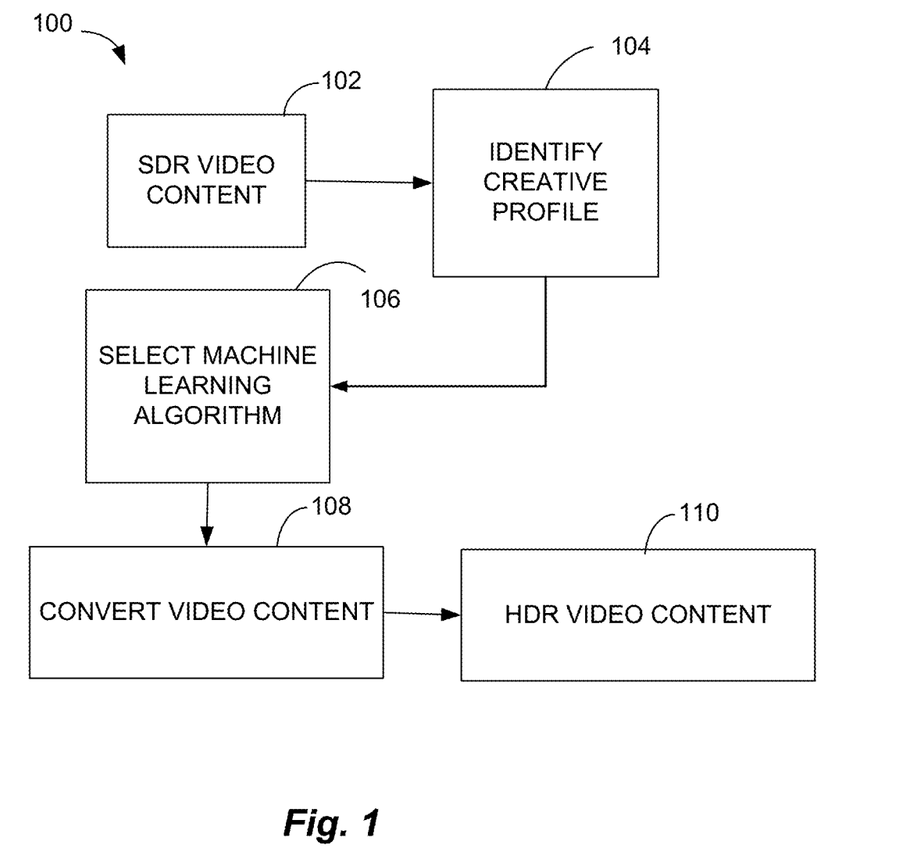
FIG. 1 is a schematic diagram illustrating an overview of automatically converting a source video content constrained to a first color space to a video content constrained to a second color space using artificial intelligence machine-learning algorithm based on a creative profile.

FIG. 1 shows an overview 100 of automatically converting a source video content constrained to a first color space to a video content constrained to a second color space using artificial intelligence machine-learning algorithm based on a creative profile. As used herein, a "creative profile" comprises a machine-readable data set that describes a creative style of rendering visible and/or audible output in enough detail to enable a machine to produce content that complies with the creative style. A creative profile functions as an identifier of a machine learning (ML) conversion algorithm that has trained to convert content according to a particular style, enabling selection of the algorithm from a library of different algorithms each developed by training a ML component in different creative style. As such, an identifier used for the creative profile may include as much or as little descriptive information about the creative style as a system designer finds appropriate. In the aspect of FIG. 1, the source video content is SDR and the video content constrained to a second color space, or converted video content, is HDR. Other automatic conversion may also use creative styles for other conversions, for example, in transcoding between any two different color spaces. The method 100 may be performed by one or more computer processors, for example at a server. At the process 102, the one or more processors receive or select a source SDR video content. The source video content may be received or selected from a local database or from a remote or distributed database. At computer process 104, the one or more processors identify a creative profile (as shown further in FIG. 3A). In an aspect, the creative profile may be based preferences of a person or group of people, for example, a colorist, director, director of photography, cinematographer, and the like. Preference information may be gathered by survey of the creative source, inferred by inspecting past creative choices, or by a combination of the foregoing. In an aspect, the creative profile may be based on preferences of a facility or other collective entity, for example, a post production facility. In another aspect, the creative profile may include a combination of preferences of a person or group and preferences of a facility.

At computer process 106, the one or more processors select a machine-learning (ML) algorithm that will be used to convert the source SDR video content. In an aspect, the one or more processors select the machine-learning algorithm based on information from the creative profile identified in process 104. As known in the art, ML algorithms are trained over a training set of inputs and outputs. ML is useful for conversions from more limited color spaces (e.g., SDR spaces) to more extended color spaces (e.g., HDR spaces) in which a value in the more limited space can have more than one interpretation in the extended space. By learning choices made during prior conversions from SDR to HDR, the ML algorithm can learn to make similar choices when processing new input data. Conventional wisdom teaches use of the largest possible training set for more consistent output. However, the more stylistically diverse the training set, the more generic the output will be and the more likely it is that the ML algorithm will inject undesired stylistic changes in the result. Selection of the ML conversion algorithm based on a creative profile of the content it is trained on enables faithful interpretation of the creative profile in the output. In an aspect, the machine-learning algorithm may be, or may include, a deep neural network algorithm. The one or more processors may further select the ML learning algorithm from a set of trained ML algorithm. Further details of the ML training are described in connection with FIG. 4B below.

At computer process 108, the one or more processors convert the source SDR video content to HDR video content. In an aspect as described above, the one or more processors covert the source SDR video content based on data from an identified creative profile. Conversions may include upscaling or downscaling with respect to resolution or color space. In either case, processes applied by the conversion algorithm may alter the stylistic features of the output content. Selection of the ML conversion algorithm that is specifically trained on conversions having a defined creative style enables the resulting converted content to comply with the selected creative style.

At computer process 110, the one or more processors store the converted HDR video content in a database. The HDR video content may be transmitted for display. In an aspect, as described further below, the one or more processors may populate a training set with source images from the SDR source video content and the corresponding converted images comprising the HDR video content.

Figure 2:
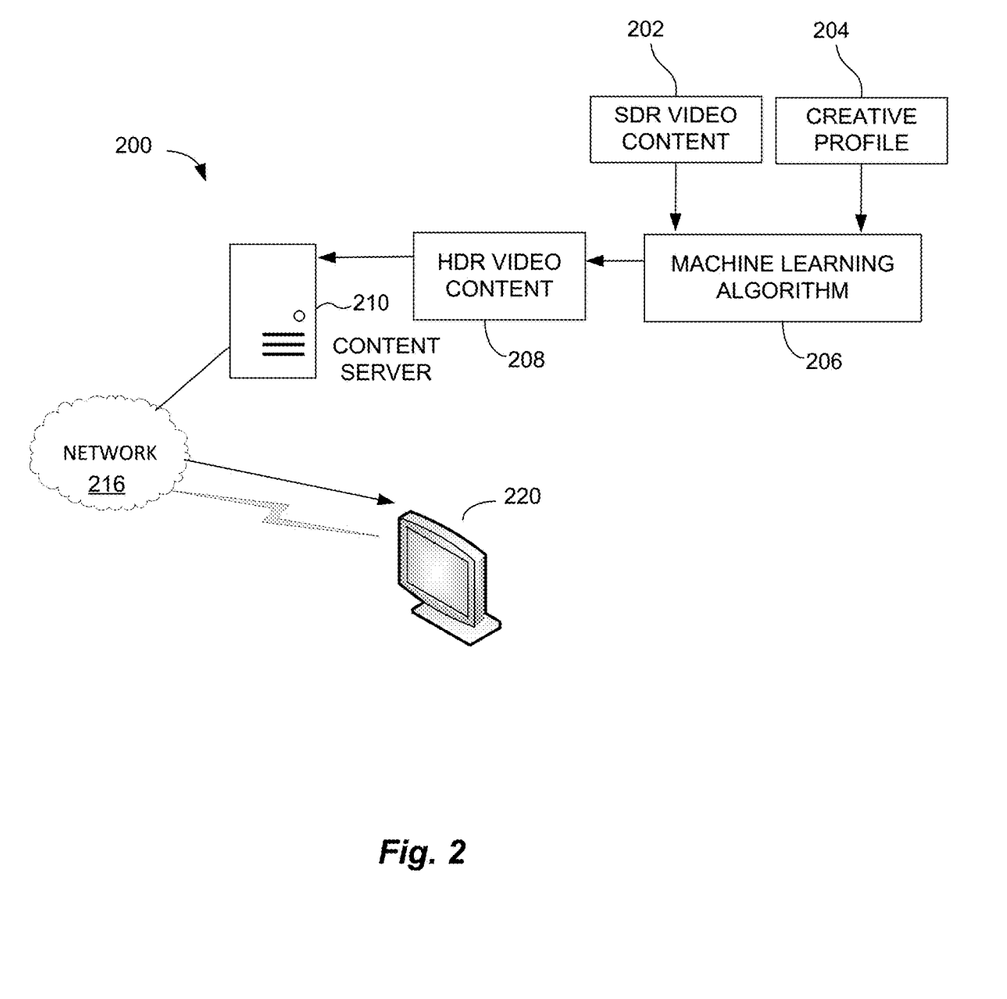
FIG. 2 is a block diagram illustrating an example of a computer network in which the novel methods and apparatus of the application may find use.

FIG. 2 shows an exemplary computer network 200 in which the novel methods and system of the application may find use. One or more content servers 210 (e.g., a server farm or cloud) interconnected through a local area network, wide area network 216, or other network may execute the processes and algorithms described herein, producing HDR video content that may be stored and distributed. In some aspects, one or more processors of the servers may convert SDR video content 202 to HDR 208 (or other conversions across a color space) by executing an ML algorithm 206 based on creative profile 204. One or more distribution servers may provide the HDR video content for processing or delivery to a variety of clients 220 from the content server 202 through the network 216, e.g., the Internet or cellular telephone and data networks. Clients 220 for playing the HDR video content may include, for example, television sets, smart phones, personal computers, notepad devices, projectors. The video content may be transcoded to a suitable format for the destination device prior to delivery.

Figure 3A:
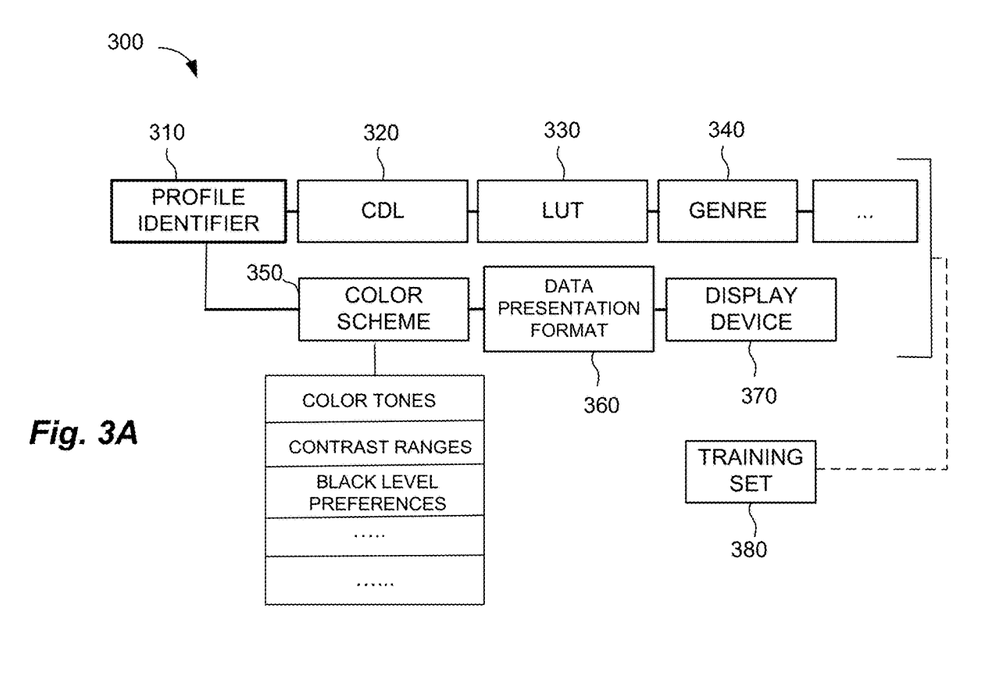
FIG. 3A is a diagram illustrating aspects of a creative profile data structure.

FIG. 3A shows aspects of a creative profile data structure 300 for use by one or more processors in converting an SDR video content to HDR video content, or in other conversions across a color space. Each creative profile may be referenced by a profile identifier 310. Each identifier may be, for example a code or an address. Based on the identifier, the one or more processors may look up further instructions and/or data in a pre-defined data structure. A creative profile may generally specify the creative intent associated with a person or facility, and to the SDR video content. More specifically, a creative profile may comprise machine-readable data associating (e.g., that associates) an SDR video content with, for example, a Color Decision List (CDL) 320, color Look-Up Table (LUT) 330, color scheme 350 (e.g., tones, contrast ranges, black level preferences, etc.), genre 340, data presentation format 360, display device specifications 370, and other stylistic parameters. In alternative embodiments, the profile identifier 310 may be implicitly associated with a certain creative style without a precise description of style parameter values. For example, a profile identifier may identify a source of a training set 380 (e.g., a creative person or group) without detailing other parameter values. Part of the reason is that stylistic choices even by the same artist may vary depending on a variety of other factors. A ML conversion algorithm trained on the artist's other work may be able to extend the artist's work to new conversions without distilling the artist's aesthetic preferences to a library of factors or a rigid rule. In other words, the presence of a creative profile 300 may be implied for a ML conversion algorithm trained on a training set 380 limited to a certain style, without being defined by other machine-readable data.

Figure 3B:
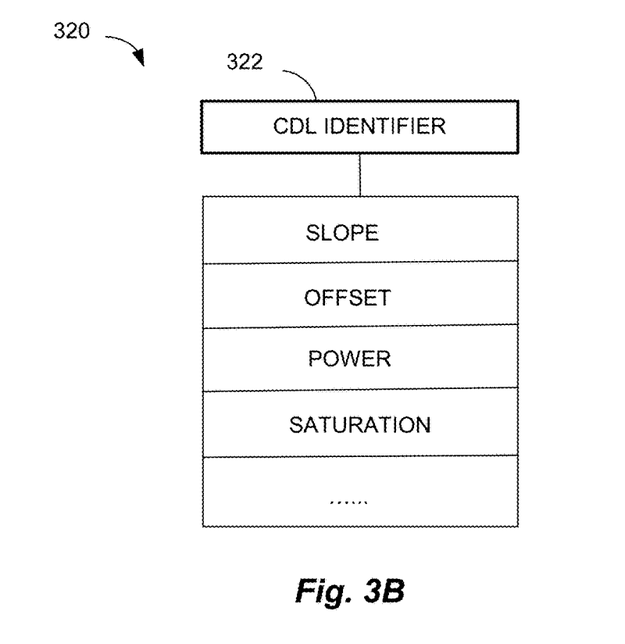
FIG. 3B is a diagram illustrating aspects of a color decision list data structure.

Nonetheless, the use of creative style parameters may be useful to better understand the qualities of various creative styles and avoid an unneeded multiplicity of different conversion algorithms. FIG. 3B shows aspects of a Color Decision List (CDL) 320 for use by one or more processors in converting an SDR video content to HDR video content. In an aspect, each CDL may be referenced by a CDL identifier 322. Each identifier may be, for example a code or an address. Based on the identifier, the one or more processors may look up further instructions and/or data in a pre-defined data structure. A CDL generally includes basic primary color grading information. More specifically, a CDL may comprise machine-readable data specifying parameters the apply to color components, for example, slope, offset, power, saturation, and so on.

Figure 4A:
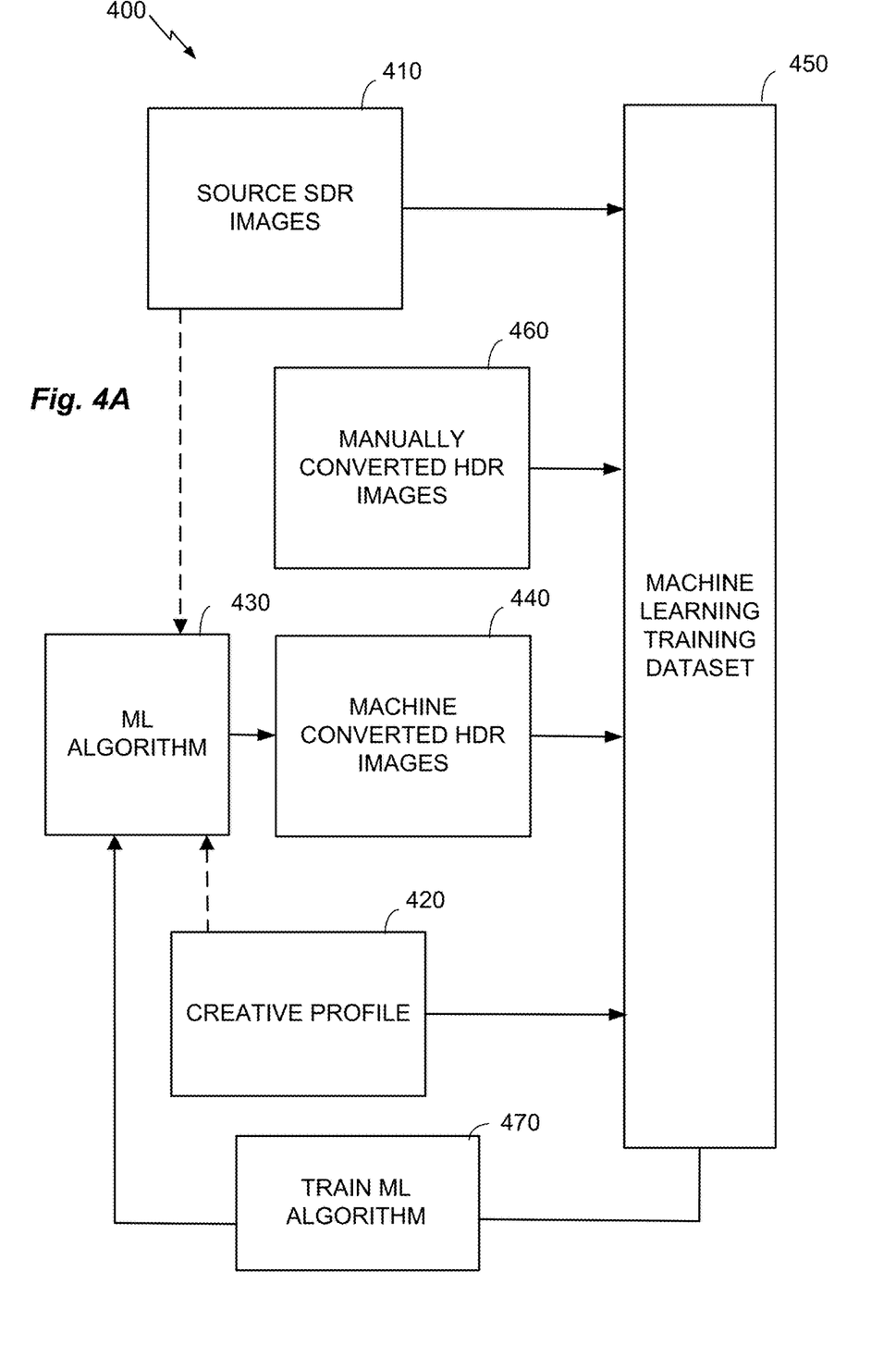
FIG. 4A is a block diagram illustrating data and components associated with an automatic process for converting a source video content constrained to a first color space to a video content constrained to a second color space using artificial intelligence machine-learning algorithm based on a creative profile.

FIG. 4A shows a block diagram 400 of data and components associated with an automatic process of training a machine-learning algorithm for use in converting a source video content constrained to a first color space to a video content constrained to a second color space based on a creative profile, according to some aspects of the present disclosure. The system and methods of the present disclosure maintain a training dataset 450 for training the ML algorithm. In an aspect, the system and methods may populate the dataset 450 with source images and the corresponding converted images that have been manually converted through a manual process, for example, source SDR images 410 and the corresponding manually converted HDR images 460. In an aspect, the system and methods may populate the dataset 450 with source images and the corresponding converted images that have been converted through an automatic process using an ML algorithm, for example, source SDR images 410 and the corresponding converted HDR images 440 converted using ML algorithm 430. In some embodiments, the system and methods may populate the dataset 450 with both manually converted HDR images 460 and HDR images 440 converted using ML algorithm 430.

In an alternative, or in addition, the system and methods may populate the dataset 450 with source images and the corresponding converted images that have been approved by the creative whose creative profile was used in the conversion, or converted images that meet or exceed one or more parameter thresholds in creative profile 420.

In an aspect, the source images may be manually selected. In an aspect, the creative profile 420 may be manually created. In an aspect, the ML algorithm 430 may define, for example through learning, the parameters of creative profile 420. For example, a ML algorithm may notice specific technical parameters and use them to automatically characterize such parameters in the creative profile. In an aspect, humans may not even be aware of such technical parameters. The training dataset 450 may then be used by component 470 (described in further detail below) to iteratively train ML algorithm 430 for use in subsequent conversion processes.

Figure 4B:
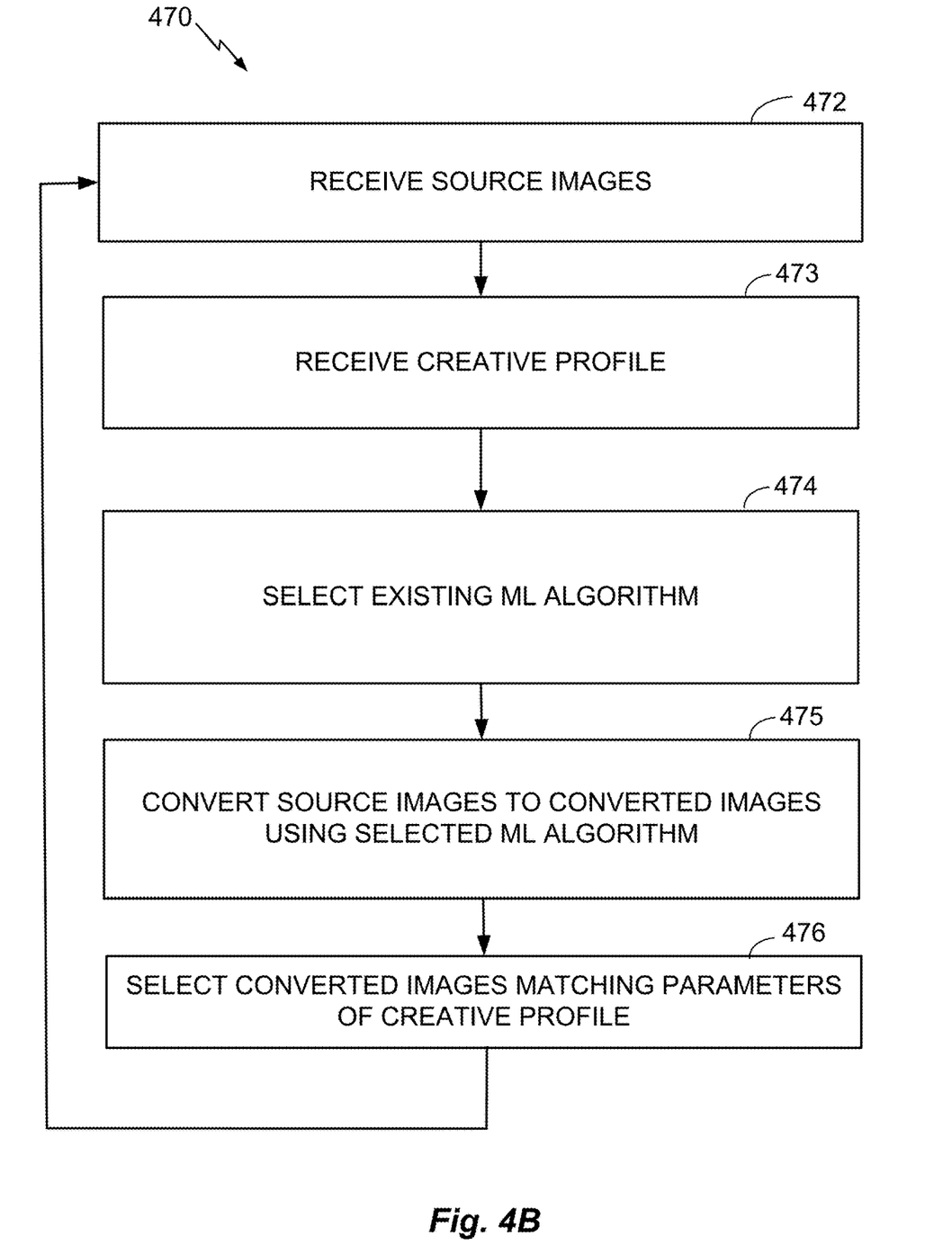
FIG. 4B is a flow diagram illustrating an automatic process for training machine learning algorithm.

FIG. 4B diagrams a useful automatic process 470 for training ML algorithm for converting a source video content constrained to a first color space to a video content constrained to a second color space based on a creative profile. At 472, a processor receives source images to be converted, for example, source SDR images. The processor may receive the source images from a manual process (e.g., input by a user) or by retrieving data from a data source. At 473, the processor receives a creative profile for use in the conversion. The creative profile may be manually identified, or the processor may identify the creative profile based on selected criteria, for example, a personal identity for the source images received at 472. At 474, the processor selects an existing ML algorithm for training. The selected ML algorithm may be the most recently trained ML algorithm based on the creative profile received at 473. At 475, the processor applies the selected ML algorithm to the source images, based on the received creative profile, to convert the source images to converted images. In an aspect, at 476, the processor selects from the converted images those that meet or exceed certain parameter thresholds for the technical parameters of the creative profile. In another aspect, at 476, the processor selects from the converted images those that meet or exceed certain parameter thresholds for the technical parameters of the creative profile. The selected converted images may then be fed back to 472 as source images for the next iteration of training.

In the aspect of the disclosure illustrated in FIG. 4B, the processor may generate a profile-based model for the ML algorithm. As shown in FIG. 3A, by including data from a creative profile, the training dataset comprises data such as CDL, LUT, color scheme, genre, and so on. The ML algorithm thus learns a specific creative's style or profile.

In another aspect, the processor may not include creative profile data in the training dataset. In this aspect, the processor generates a generic model for the ML algorithm using only, for example, SDR-HDR pair data. The generic model may then be used to generate, for example, generic HDR quality content from a given SDR content.

Figure 5:
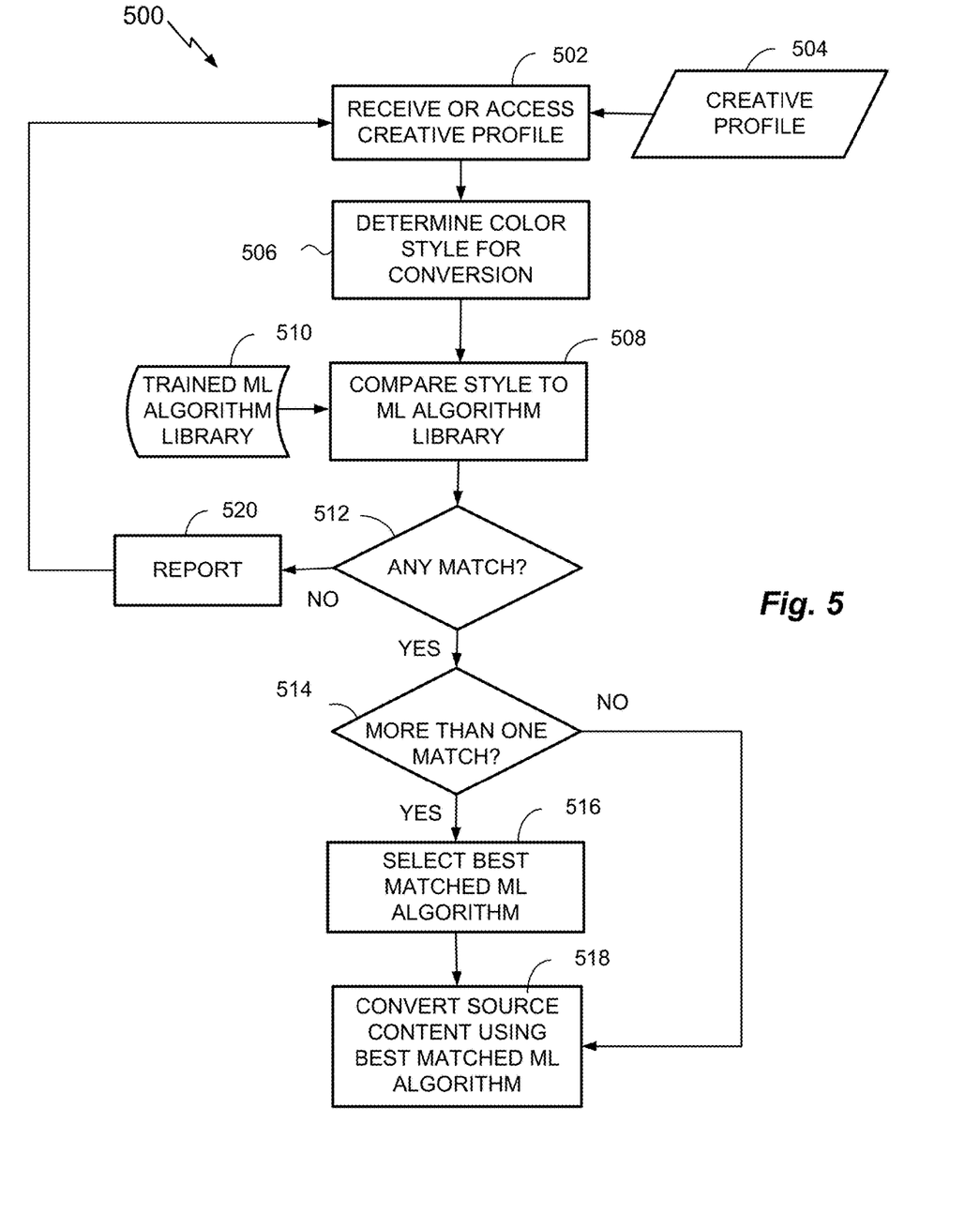
FIG. 5 is a flow diagram illustrating an automatic process for selecting a machine learning algorithm.

FIG. 5 diagrams a useful automatic process 500 for selecting an ML algorithm for converting a source video content constrained to a first color space to a video content constrained to a second color space based on a creative profile. At 502, a processor receives or accesses the creative profile, for example, creative profile 504 held in a computer memory. As described herein, the creative profile may include technical parameters indicating preferences of a person or a facility, to be matched to a ML algorithm trained on a training set matching the creative profile. In some embodiments, the creative profile may also include acceptable threshold for each of the technical parameters. In some embodiments, the technical parameters in the creative profile may have ranking, for example, "Contrast" may have a higher rank of importance than "Light." At 506, the processor determines the color style for use in the conversion. In an aspect, the color style may include a combination of technical parameters from the creative profile, for example, the technical levels for Light, Exposure, Contrast, Highlights, Shadows, Blacks, Whites, etc. At 508, the processor compares the color style to those associated with one or more trained ML algorithms from a library, for example, trained ML algorithm library 510. At 512, the processor determines whether it has found any ML algorithm with color style processing that matches the color style of the targeted creative profile. In an aspect, the processor may determine there is a match when there are enough technical parameters associated with an ML algorithm that meet or exceed the thresholds for the corresponding technical parameters in the creative profile. At 514, the processor determines if there is more than one matching profile. At 516, if there is more than one match, the processor selects a best match from the list of matched ML algorithms. In an aspect, the best matched ML algorithm may be one that includes the most technical parameters that meet or exceed the thresholds. When two or more matched ML algorithms have equal number of technical parameters that meet or exceed the thresholds, the processor, in an aspect, may select as best match the ML algorithm that includes proportionally more technical parameters with higher rankings. In some cases, such as when it is desired to emulate a predetermined style of color conversion, the processor may select the ML algorithm specified by a user-supplied identifier without looking for other matching algorithms.

At 518, the processor proceeds to convert the source video content using the best matched ML algorithm. Back at 514, it the processor finds only one matched ML algorithm, it also proceeds to 518 to convert the source video content using the matched ML algorithm.

Back at 512, if the processor determines that there is no ML algorithm with color style that matches the color style of the creative profile, it may send a report at 520 and return to 502 to wait for or to access another creative profile. In an aspect, another profile may be one that also belongs to the same person or facility of the previous creative profile. In an aspect, the processor determines that there is no ML algorithm match when there is no technical parameter associated with any ML algorithm in the library that meets the thresholds for the corresponding technical parameters in the creative profile.

Figure 6A:
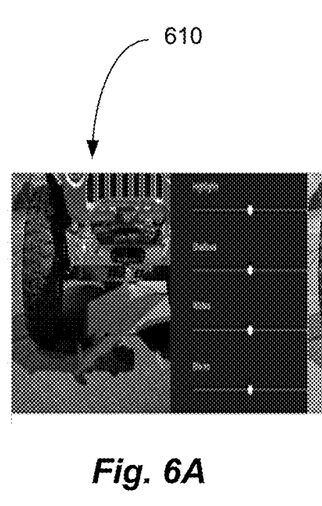
FIGS. 6A-6C are examples illustrating a source content converted not using and using creative profile.
Figure 6B:
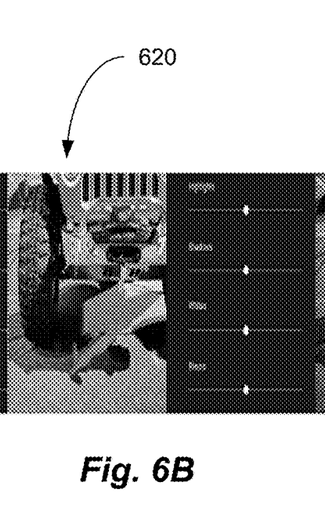
Figure 6C:
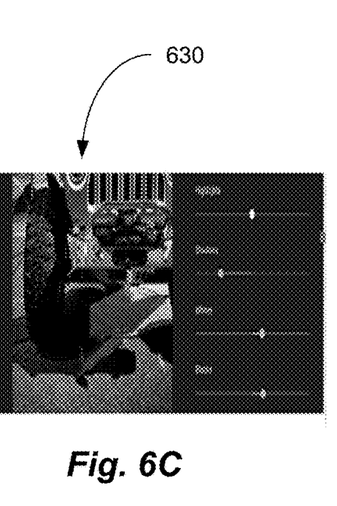

FIGS. 6A-6C are examples illustrating a source content being converted not using, and using, a creative profile. FIG. 6A illustrates a source SDR content image 610. FIG. 6B illustrates a converted HDR image 620 using a generic profile, for example a profile having only a luminance gain of 50%. FIG. 6C illustrates a converted HDR image 630 using a profile having individually specified technical parameters (Light, Exposure, Contrast, Highlights, Shadows, Blacks, Whites, etc.).

Figure 7:
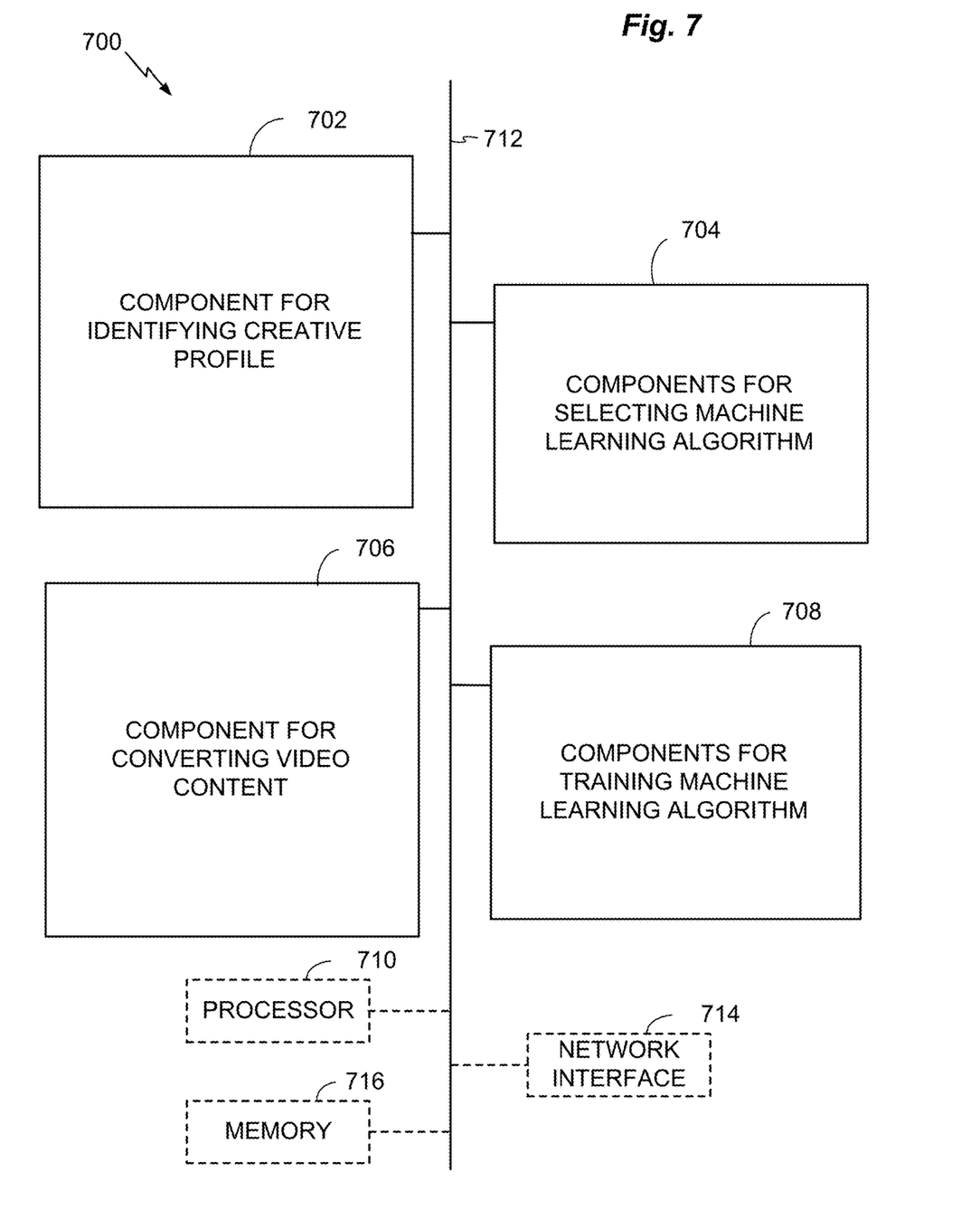
FIG. 7 is a conceptual block diagram illustrating components of an apparatus or system for the methods as shown in FIGS. 1, 4A, 4B and 5.

FIG. 7 is a conceptual block diagram illustrating components of an apparatus or system 700 for converting a source video content constrained to a first color space to a video content constrained to a second color space using artificial intelligence machine-learning algorithm based on a creative profile, and for training the machine-learning algorithm as described herein, according to one embodiment. As depicted, the apparatus or system 700 may include functional blocks that can represent functions implemented by a processor, software, or combination thereof (e.g., firmware).

As illustrated in FIG. 7, the apparatus or system 700 may comprise an electrical component 702 for identifying a creative profile. The component 702 may be, or may include, a means for said identifying. Said means may include the processor 710 coupled to the memory 716, and to the network interface 714, the processor executing an algorithm based on program instructions stored in the memory. Such algorithm may include a sequence of more detailed operations, for example, as described in connection with blocks 104 and 204 of FIGS. 1 and 2 above. For further example, this may include receiving an identifier from a user for a ML algorithm or associated creative profile or receiving a technical specification for a creative profile that can be matched to one or more ML algorithms having different profiles.

The apparatus or system 700 may further comprise an electrical components 704 for selecting a ML algorithm. The components 704 may be, or may include, a means for said selecting. Said means may include the processor 710 coupled to the memory 716, and to the network interface 714, the processor executing an algorithm based on program instructions stored in the memory. Such algorithm may include a sequence of more detailed operations, for example, as described in connection with block 106 of FIG. 1 or process 500 of FIG. 5.

The apparatus or system 700 may further comprise an electrical component 706 for converting the source video content. The component 706 may be, or may include, a means for said converting. Said means may include the processor 710 coupled to the memory 716, and to the network interface 714, the processor executing an algorithm based on program instructions stored in the memory. Such algorithm may include a sequence of more detailed operations, for example, as described in connection with blocks 108 and 206 of FIGS. 1 and 2. For further example, the means for converting may include providing a ML algorithm trained on content of a known creative style with source content to be converted, executing the ML algorithm which outputs converted content, and saving the result. Conversions may be of the same resolution, in which each pixel of the source image is recharacterized by different parameters in the new color space for the converted copy. In other embodiments, conversions may be of different resolutions, in which the algorithm maps one or more pixels of the source to a different number of pixels of the conversion.

The apparatus or system 700 may further comprise electrical components 708 for training ML algorithm. The component 708 may be, or may include, a means for said training. Said means may include the processor 710 coupled to the memory 716, and to the network interface 714, the processor executing an algorithm based on program instructions stored in the memory. Such algorithm may include a sequence of more detailed operations, for example, as described in connection with block 470 of FIG. 4A and blocks 472-476 of FIG. 4B. Training is done in advance of application of the ML algorithm for conversion. Successful conversions may be added to the training set for further refinement, for example after adjustment by a human editor.

As shown, the apparatus or system 700 may include a processor component 710 having one or more processors, which may include a digital signal processor. The processor 710, in such case, may be in operative communication with the modules 702-708 via a bus 712 or other communication coupling, for example, a network. The processor 710 may initiate and schedule the functions performed by electrical components 702-708.

In related aspects, the apparatus 700 may include a network interface module 714 operable for communicating with a storage device, with media clients, or other remote devices over a computer network. In further related aspects, the apparatus 700 may optionally include a module for storing information, such as, for example, a memory device/module 716. The computer readable medium or the memory module 616 may be operatively coupled to the other components of the apparatus 700 via the bus 712 or the like. The memory module 716 may be adapted to store computer readable instructions and data for effecting the processes and behavior of the modules 702-708, and subcomponents thereof, or the processor 710, or the methods described herein. The memory module 716 may retain instructions for executing functions associated with the modules 702-708. While shown as being external to the memory 716, it is to be understood that the modules 702-708 can exist within the memory 716.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the application and design constraints imposed on the overall system. Skilled artisans may implement the described functionality in varying ways for each application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer or system of cooperating computers. By way of illustration, both an application running on a server and the server can be a component. One or more components may reside within a process and/or thread of execution and a component may be localized on one computer and/or distributed between two or more computers.

In the foregoing description and in the figures, like elements are identified with like reference numerals. The use of "e.g.," "etc.," and "or" indicates non-exclusive alternatives without limitation, unless otherwise noted. The use of "including" or "include" means "including, but not limited to," or "include, but not limited to," unless otherwise noted.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B", when used in conjunction with open-ended language such as "comprising" can refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

In many instances, entities are described herein as being coupled to other entities. The terms "coupled" and "connected" (or any of their forms) are used interchangeably herein and, in both cases, are generic to the direct coupling of two entities (without any non-negligible (e.g., parasitic) intervening entities) and the indirect coupling of two entities (with one or more non-negligible intervening entities). Where entities are shown as being directly coupled together or described as coupled together without description of any intervening entity, it should be understood that those entities can be indirectly coupled together as well unless the context clearly dictates otherwise. The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Various aspects will be presented in terms of systems that may include several components, modules, and the like. It is to be understood and appreciated that the various systems may include additional components, modules, etc. and/or may not include all the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Operational aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Furthermore, the one or more versions may be implemented as a method, apparatus, or article of manufacture using standard programming and/or engineering techniques to produce software, firmware, hardware, or any combination thereof to control a computer to implement the disclosed aspects. Non-transitory computer readable media can include but are not limited to magnetic storage devices (e.g., hard disk, floppy disk, magnetic strips . . . ), optical disks (e.g., compact disk (CD), digital versatile disk (DVD), Blu-Ray™ . . . ), smart cards, solid-state devices (SSDs), and flash memory devices (e.g., card, stick). Of course, those skilled in the art will recognize many modifications may be made to this configuration without departing from the scope of the disclosed aspects.

The previous description of the disclosed aspects is provided to enable any person skilled in the art to make or use the present disclosure. Various modifications to these aspects will be clear to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein.

Additionally, it should be further appreciated that the methodologies disclosed herein are capable of being stored on an article of manufacture to facilitate transporting and transferring such methodologies to computers.

The invention claimed is:

1. A computer-implemented method for automatic conversion of video content, the method comprising:
identifying, by one or more processors, a creative profile for source video content constrained to a first color space, wherein the creative profile specifies (i) a creative style associated with the source video content and (ii) a machine-learning algorithm associated with the creative style;
selecting, by the one or more processors, the machine-learning algorithm from among a plurality of machine-learning algorithms based on the creative profile, wherein the machine-learning algorithm is trained to convert content from the first color space to a second color space according to the creative style; and
converting, by the one or more processors executing the machine-learning algorithm, the source video content to converted video content constrained to the second color space, wherein the converted video content is consistent with the creative style.

2. The method of claim 1, wherein the source video content is Standard Dynamic Range (SDR) video content and the converted video content is High Dynamic Range (HDR) video content.

3. The method of claim 1, wherein the source video content is raw video content and the converted video content is selected from Standard Dynamic Range (SDR) video content or High Dynamic Range (HDR) video content.

4. The method of claim 1, further comprising training the machine-learning algorithm over a training set comprising of source images and corresponding converted images matching the creative profile.

5. The method of claim 4, further comprising, prior to the training over the training set, training the machine-learning algorithm over a generic training set including content matching multiple creative profiles.

6. The method of claim 4, wherein the training set further comprises one or more machine-readable data of the creative profile.

7. The method of claim 4, further comprising populating the training set with the source images, wherein the source images comprise source video content and wherein the corresponding converted images comprise HDR video content converted from the source video content.

8. The method of claim 7, wherein the source video content is selected from at least one of raw video content and SDR video content.

9. The method of claim 7, wherein the populating further comprises determining that each of the corresponding converted images is approved or meets or exceeds a parameter threshold for a technical parameter in the creative profile.

10. The method of claim 1, wherein the creative profile comprises machine-readable data associating the source video content with at least one personal identity.

11. The method of claim 10, wherein the machine-readable data associates the at least one personal identity with a video production role comprising any one or more of a director, a director of photography, a cinematographer, and a colorist.

12. The method of claim 1, wherein the creative profile comprises machine-readable data associating the source video content with a genre of video content.

13. The method of claim 1, wherein the creative profile comprises machine-readable data associating the source video content with at least one of a Color Decision List (CDL) or a color Look-Up Table (LUT).

14. The method of claim 1, wherein the creative profile comprises machine-readable data associating the source video content with a scheme for at least one of, color tones, contrast ranges, or black level preferences.

15. The method of claim 1, wherein the machine-learning algorithm comprises a deep neural network algorithm.

16. An apparatus for automatic conversion of video content, the apparatus comprising at least one processor coupled to a memory, the memory holding program instructions that when executed by the at least one processor cause the apparatus to perform:
identifying a creative profile for source video content constrained to a first color space, wherein the creative profile specifies (i) a creative style associated with the source video content and (ii) a machine-learning algorithm associated with the creative style;
selecting the machine-learning algorithm from among a plurality of machine-learning algorithms based on the creative profile, wherein the machine-learning algorithm is trained to convert content from the first color space to a second color space according to the creative style; and
converting, at least in part by executing the machine-learning algorithm, the source video content to converted video content constrained to the second color space, wherein the converted video content is consistent with the creative style.

17. The apparatus of claim 16, wherein the memory holds further instructions for identifying the source video content comprising Standard Dynamic Range (SDR) video content and converting to the converted video content comprising High Dynamic Range (HDR) video content.

18. The apparatus of claim 16, wherein the memory holds further instructions for identifying the source video content comprising raw video content and converting to the converted video content selected from Standard Dynamic Range (SDR) video content or High Dynamic Range (HDR) video content.

19. The apparatus of claim 16, wherein the memory holds further instructions for selecting the source video content from at least one of raw video content and SDR video content.

20. The apparatus of claim 16, wherein the memory holds further instructions for training the machine-learning algorithm over a training set comprising source images and corresponding converted images matching the creative profile.

* * * * *

UNITED STATES PATENT AND TRADEMARK OFFICE
CERTIFICATE OF CORRECTION

PATENT NO. : 12,133,030 B2
APPLICATION NO. : 17/417110
DATED : October 29, 2024
INVENTOR(S) : Michael Zink and Ha Nguyen It is certified that error appears in the above-identified patent and that said Letters Patent is hereby corrected as shown below:

In the Claims

In Column 13, Line 35, before "source" delete "of"

Signed and Sealed this
Tenth Day of December, 2024

*Katherine Kelly Vidal*
Katherine Kelly Vidal
*Director of the United States Patent and Trademark Office*